United States Patent [19]

Harlow

[11] 4,382,048
[45] May 3, 1983

[54] METHOD FOR PRODUCING SINTERED CERAMIC, LAYERED, CIRCULAR FUEL PELLETS

[75] Inventor: John L. Harlow, East Berne, N.Y.

[73] Assignee: The United States of America as represented by the United States Department of Energy, Washington, D.C.

[21] Appl. No.: 301,786

[22] Filed: Sep. 14, 1981

[51] Int. Cl.³ .............................................. G21C 21/00
[52] U.S. Cl. ..................................... 264/0.5; 252/643; 264/60; 376/455
[58] Field of Search ................... 252/643; 264/0.5, 60; 376/431, 455, 903

[56] References Cited

U.S. PATENT DOCUMENTS

| | | | |
|---|---|---|---|
| 3,325,419 | 6/1967 | Hurley et al. | 252/643 |
| 3,649,452 | 3/1972 | Chin et al. | 252/639 X |
| 3,755,513 | 8/1973 | Stoll et al. | 264/0.5 |
| 3,845,177 | 10/1974 | Burnett | 264/0.5 |
| 3,949,026 | 4/1976 | Devillard | 264/0.5 |
| 4,048,090 | 9/1977 | Hannerz | 264/0.5 X |
| 4,158,681 | 6/1979 | Funke | 264/0.5 |

FOREIGN PATENT DOCUMENTS 55-104759  8/1980  Japan .................................. 376/455

Primary Examiner—Leland A. Sebastian
Attorney, Agent, or Firm—Michael F. Esposito; Richard G. Besha; James E. Denny

[57] ABSTRACT

A compacting die wherein the improvement comprises providing a screen in the die cavity, the screen being positioned parallel to the side walls of said die and dividing the die cavity into center and annular compartments. In addition, the use of this die in a method for producing an annular clad ceramic fuel material is disclosed.

14 Claims, 1 Drawing Figure

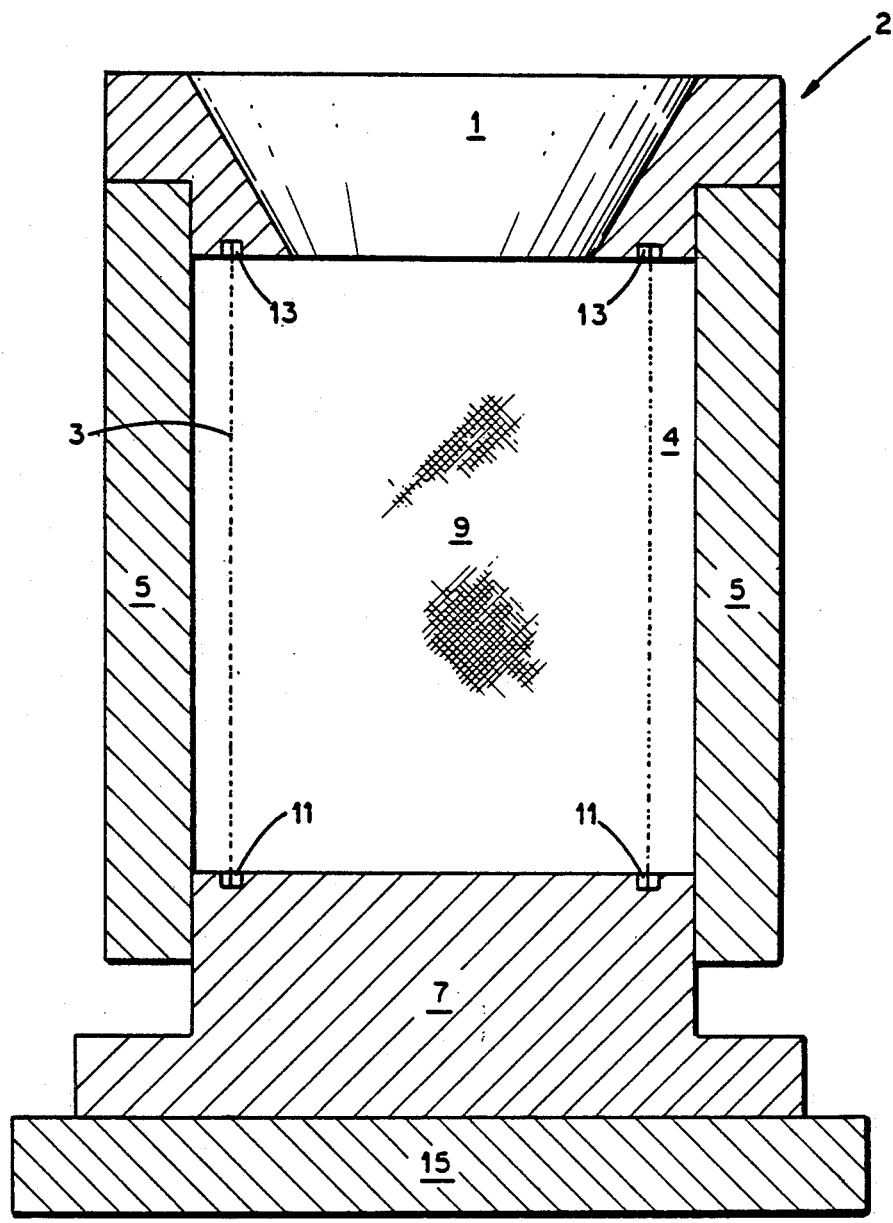

METHOD FOR PRODUCING SINTERED CERAMIC, LAYERED, CIRCULAR FUEL PELLETS

The U.S. Government has rights in this invention pursuant to Contract No. EY-76-C-12-0052 between the Department of Energy and General Electric Co.

BACKGROUND OF THE INVENTION

This invention relates to a method and apparatus for producing a high density ceramic fuel pellet. In particular, the invention is directed to a method and apparatus for producing a high density ceramic pellet comprising $ThO_2$ and $UO_2$ having an outer annular shell comprising $ThO_2$.

U.S. Pat. No. 3,325,419 to Hurley et al discloses nuclear fuel pellets comprising $ThO_2$ and $UO_2$ with a protective cladding layer of silica. The pellets are formed by a complicated procedure involving the formation of an aqueous sol of thoria and urania and a cladding solution of silica.

U.S. Pat. No. 3,755,513 to Stoll et al discloses a sintered ceramic oxide fuel material comprising $UO_2$ or mixtures of $UO_2$ with plutonium dioxide or thorium dioxide. The method disclosed by Stoll et al includes adding a compound which is decomposable at temperatures of up to 600° C. to the $UO_2$ powder or mixture of $UO_2$ with plutonium dioxide or thorium dioxide and sintering at high temperatures.

Another procedure used to form a sintered ceramic oxide fuel comprises mixing in small quantities of solid organic additives with the ceramic oxide particles. The disadvantages of this procedure are the cost of the production of the fuel and the attendent necessary additional protective steps involved in using organic material.

A common problem associated with the fabrication of sintered high density pellets composed of $ThO_2$ and $UO_2$ is that some of the particles exposed on the pellet surface can be fractured during fabrication. Accordingly, if $UO_2$ particles are present on the exposed pellet surface fracturing of these particles may occur. When these fractured particles are irradiated, they can be expected to extrude out from the $ThO_2$ and approach, or contact, the inner surface of the fuel pellet cladding. This fuel-cladding contact is of great concern because it increases the potential for cladding rupture with concomitant fission product release. To reduce the potential for fuel-cladding contact, an annular shell of $ThO_2$ has been proposed to act as a barrier to fuel extrusion. However, the formation of an annular contiguous bonded $ThO_2$ shell is difficult because of the high potential for delamination. Prior attempts at forming this annular shell have not been successful. The present invention is directed to a method and apparatus for producing a sintered high densified ceramic having a bonded outer shell which prevents or substantially diminishes fuel-cladding contact.

SUMMARY OF THE INVENTION

It is the primary object of the present invention to provide a novel method of producing a sintered high density ceramic fuel material.

It is another object of the present invention to provide a novel method of producing a sintered high density ceramic fuel element comprising $UO_2$ and $ThO_2$.

In still another object of the present invention to provide a novel method for producing a sintered high density ceramic fuel pellet having an annular shell composed of a non-fissile material contiguously bonded to the center core of the pellet.

It is a further object of the present invention to provide a new and improved die apparatus for use in producing a sintered high density ceramic fuel pellet.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention as embodied and broadly described herein, the process of this invention comprises locating at least two particulate ceramic materials having different particle sizes in a container and agitating these materials to form a uniform mixture. The mixture is transferred from the container into the center compartment of a compacting die. The compacting die includes a screen having a mesh size sufficient to pass at least one, but not all, of said particulate materials. The screen is positioned in the die cavity parallel to the side walls of the die, dividing the die cavity into center and annular compartments. Once the mixture has been placed into the center compartment of the die, the compacting die is vibrated to sift at least one, but not all, of the particulate material from said center compartment into said annular compartment producing an outer layer about a center core. The screen is removed from the die, and heat and pressure are applied in an amount sufficient to produce a sintered high density ceramic fuel pellet.

In a preferred embodiment of the process of the present invention the particulate ceramic materials are selected from the group consisting of $UO_2$ and $ThO_2$.

In a still further preferred embodiment of the method of the present invention, the $ThO_2$ particle size is selected to enable the particulate $ThO_2$ to pass through the screen into the annular compartment of the die.

In another preferred embodiment of the method of the present invention, heat is applied until a temperature in the range of about 1600° to 2000° C. is reached, and pressure is applied in the range of from about 10,000 to 30,000 psi.

In still another preferred embodiment of the process of the present invention, the particulate materials are added directly to the center compartment of the compacting die and agitated in the center compartment to form the mixture.

In a further preferred embodiment of the process of the present invention, a mixture of the particulate materials are added directed to the center compartment of the compacting die.

In a further aspect of the present invention the new and improved apparatus for producing the sintered high density ceramic fuel element comprises a compacting die wherein the improvement comprises providing a screen in the die cavity, the screen being positioned parallel to the side walls of said die and dividing the die cavity into center and annular compartments.

In a preferred embodiment of the apparatus of the present invention the screen is shaped in the form of a cylinder.

The accompanying drawing which is incorporated in and forms a part of the specification is a cross-sectional view of the compacting die of the present invention.

DETAILED DESCRIPTION OF THE INVENTION

With reference to the FIGURE, a detailed description of the process and apparatus of the present invention is now set forth.

At least two particulate ceramic materials (not shown) having different particle sizes are located in the center compartment 9 of compacting die 2 via funnel 1. The particulate materials are agitated to obtain a substantially uniform mixture of these materials. Compacting die 2 is vibrated by vibrating mechanism 15 attached to bottom punch 7 of die 2. Mechanism 15 may be selected from any conventional mechanism utilized to produce vibration. At least one, but not all of the particulate material is sifted from center compartment 9 through screen 3 into annular compartment 4 producing an outer layer about a center core. Screen 3 is removed from die 2. To facilitate the removal of screen 3, funnel 1 may be attached to screen 3. It should be understood that this is merely a preferred embodiment of the present invention and screen 3 may be removed separately from funnel 1, if so desired. A top support (not shown) is placed into position above the resulting unfired article to close the die. The resulting unfired article in the closed die is subjected to high temperature and pressure to produce a sintered highly densified ceramic fuel pellet. The pellet is characterized by possessing an annular shell composed of a non-fissile material which substantially eliminates the potential problem of fuel-cladding contact.

The heating and pressurizing is performed within the range of about 1600°–2000° C. and about 10,000 to 30,000 psi.

With reference to the FIGURE, the novel apparatus of the present invention will be described in detail. Compacting die 2 comprising side walls 3 and 5, respectively, and bottom punch 7, is a conventional piece of equipment. The present invention involves positioning screen 3 in the die cavity with the walls of screen 3 parallel to side walls 5 of die 2 and dividing the die cavity into center compartment 9 and annular compartment 4.

In a preferred embodiment of the present invention screen 3 is shaped in the form of a cylinder.

Screen 3 is kept in place within die 2 by providing slots 11 within bottom punch 7.

In a preferred embodiment, funnel 1, which may be utilized to facilitate in the placing of the particulate ceramic material into the die, is provided with slots 13 to secure screen 3 at the top.

In a further preferred embodiment, screen 3 is positioned and removed from the die cavity by attachment to funnel 1. Funnel 1 may be attached to screen 3 by any conventional means such as fasteners (e.g. screws).

It should be understood that the particulate ceramic materials may be premixed in a separate container prior to placement in center compartment 9.

While not being limited to any particular theory it is postulate that the above described process and apparatus substantially reduced the potential for fuel cladding contact because the contiguous bonded annular shell formed during sintering provides a barrier to any fissile fuel extrusion.

The foregoing description of the preferred embodiments of the invention has been presented for purposes of illustration and description. It is not intended to be exhaustive or to limit the invention to the precise form disclosed, and obviously many modifications and variations are possible in light of the above disclosure. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A method of producing a sintered high density ceramic fuel pellet comprising:
    (a) locating at least two particulate ceramic materials having different particle sizes in a container;
    (b) agitating said particulate materials in said container to form a mixture;
    (c) locating said mixture in the center compartment of a compacting die, said compacting die being provided with a screen having a mesh size sufficient to pass at least one, but not all, of said particulate materials, said screen being positioned in the die cavity parallel to the side walls of said die dividing said die cavity into center and annular compartments;
    (c) vibrating said compacting die to sift at least one, but not all, of said particulate materials from said center compartment into said annular compartment thereby producing a substantially uniform outer annular layer about a center core;
    (d) removing said screen from said die;
    (e) applying heat and pressure to said die in an amount sufficient to produce a sintered high density ceramic fuel pellet.

2. The method of claim 1 wherein the particulate ceramic materials are selected from the group consisting of $UO_2$ and $ThO_2$.

3. The method of claim 2 wherein the $ThO_2$ particle size is selected to enable said particulate $ThO_2$ to pass through said screen into said annular compartment.

4. The method of claim 3 wherein the heating is to a temperature of about 1600° to 2000° C.

5. A method of producing a sintered high density ceramic fuel pellet comprising:
    (a) placing at least two particulate ceramic materials having different particle sizes into the center compartment of a die, said die being provided with a screen having a mesh size sufficient to pass at least one, but not all, of said particulate materials, said screen being positioned in the die cavity parallel to the side walls of said die and dividing said die cavity into center and annular compartments;
    (b) agitating said particulate materials in said center compartment to form a mixture;
    (c) vibrating said die to sift at least one, but not all, particulate material from said center compartment into said annular compartment thereby producing a substantially uniform outer layer about a center core;
    (d) removing said screen from said die;
    (e) applying heat and pressure to said die in an amount sufficient to produce a sintered high density ceramic fuel pellet.

6. The method of claim 5 wherein the particulate ceramic materials are selected from the group consisting of $UO_2$ and $ThO_2$.

7. The method of claim 5 wherein the $ThO_2$ particle size is selected to enable said particulate $ThO_2$ to pass through said screen into said annular compartment.

8. The method of claim 5 wherein the heating is to a temperature of about 1000° to 2000° C.

9. A compacting die wherein the improvement comprises providing a screen in the die cavity, said screen being positioned parallel to the side walls of said die and dividing said die cavity into center and annular compartments.

10. The compacting die of claim 9 wherein the screen is shaped in the form of a cylinder.

11. A method of producing a sintered high density ceramic fuel pellet comprising
   (a) placing a mixture of at least two particulate materials having different particle sizes into the center compartment of a compacting die, said compacting die being provided with a screen having a mesh size sufficient to pass at least one, but not all, of said particulate materials, said screen being positioned in the die cavity parallel to the side walls of said die and dividing said die cavity into center and annular compartments,
   (b) vibrating said compacting die to sift at least one, but not all, of said particulate materials from said center compartment into said annular compartment thereby producing a substantially uniform outer annular layer about a center core;
   (c) removing said screen from said die;
   (d) applying heat and pressure to said die in an amount sufficient to produce a sintered high density ceramic fuel pellet.

12. The method of claim 11 comprising selecting the particulate materials from the group consisting of $UO_2$ and $ThO_2$.

13. The method of claim 12 comprising selecting the particle size of said $ThO_2$ to enable said particulate $ThO_2$ to pass through said screen into said annular compartment.

14. The method of claim 12 wherein the heating is to a temperature of about 1600° to 2000° C.

* * * * *